US007966088B2

(12) United States Patent
Snyder

(10) Patent No.: US 7,966,088 B2
(45) Date of Patent: Jun. 21, 2011

(54) SYSTEM AND METHOD FOR MANUFACTURING UNIQUELY DECORATED COMPONENTS

(75) Inventor: Thomas D. Snyder, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 216 days.

(21) Appl. No.: 12/179,612

(22) Filed: Jul. 25, 2008

(65) Prior Publication Data

US 2010/0023165 A1    Jan. 28, 2010

(51) Int. Cl.
*G06F 19/00* (2011.01)
(52) U.S. Cl. .............. 700/97; 700/95; 700/182
(58) Field of Classification Search .......... 700/95–98, 700/159, 160, 163, 166, 182; 29/592
See application file for complete search history.

(56) References Cited

U.S. PATENT DOCUMENTS

| 7,895,091 | B2* | 2/2011 | Hegemier et al. ........... 700/97 |
| 2002/0057289 | A1* | 5/2002 | Crawford et al. ........... 345/744 |
| 2002/0100387 | A1* | 8/2002 | Churchwell ............... 101/488 |
| 2003/0081004 | A1* | 5/2003 | Liguori .................... 345/764 |
| 2004/0045240 | A1 | 3/2004 | McIlvaine |
| 2004/0086151 | A1* | 5/2004 | Brundage ................... 382/100 |
| 2004/0236634 | A1* | 11/2004 | Ruuttu ...................... 705/26 |
| 2005/0022924 | A1* | 2/2005 | Blackburn .................. 156/230 |
| 2006/0040081 | A1* | 2/2006 | Hodsdon et al. ............ 428/40.1 |
| 2006/0076702 | A1* | 4/2006 | Tsai et al. .................. 264/132 |
| 2006/0255493 | A1* | 11/2006 | Fouladpour ................ 264/161 |
| 2008/0317980 | A1* | 12/2008 | Yuba et al. ................. 428/29 |

FOREIGN PATENT DOCUMENTS

| JP | 2003085415 | 3/2003 |
| JP | 2003203173 | 7/2003 |
| JP | 2005177858 | 7/2005 |
| WO | 0124073 | 4/2001 |

OTHER PUBLICATIONS

International Search Report and Written Opinion from corresponding International Application No. PCT/US09/31944.

* cited by examiner

*Primary Examiner* — Charles R Kasenge
(74) *Attorney, Agent, or Firm* — Renner, Otto, Boisselle & Sklar, LLP

(57) ABSTRACT

Uniquely decorated devices may be manufactured using high speed production equipment. In one approach, a master piece of artwork is selected. For each decorated part to be fabricated, a portion of the master artwork is selected. Image data for the portion of the master artwork is input to a manufacturing tool, such as a laser etch machine. The manufacturing tool may process each part to have a representation of its corresponding portion of the artwork, resulting in plural parts that each has a unique cosmetic appearance.

11 Claims, 3 Drawing Sheets

SYSTEM AND METHOD FOR MANUFACTURING UNIQUELY DECORATED COMPONENTS

TECHNICAL FIELD OF THE INVENTION

The technology of the present disclosure relates generally to manufacturing components for consumer products such as housing parts and/or keypads for mobile telephones. More particularly, the disclosure relates to a system and method for manufacturing components that each has unique decoration.

BACKGROUND

A segment of the market for mobile telephones (and other consumer electronics and non-electronic devices) is interested in a cosmetic appearance to their individual unit that is unique. But providing unique devices is challenging in factories that are based on generating product in a high volume and with rapid cycle time as production equipment is designed to make parts with as little variation as possible.

SUMMARY

To manufacture devices that have unique appearances using high speed production equipment, the present disclosure describes systems and methods for decorating parts for the devices with unique appearances. In one approach, a master piece of artwork is selected. For each decorated part to be fabricated, a random portion of the master artwork is selected. Image data for the random portion of the master artwork is input to a manufacturing tool, such as a laser etch machine. The laser etch machine etches each part with its corresponding random portion of the artwork, resulting in plural parts that each has a unique cosmetic appearance. This approach advantageously may be applied in a high volume, rapid cycle time manufacturing process with little or no impact on throughput, cost or yield, since no or minimal delay is introduced when configuring the artwork for each part as it arrives at the decorating tool for processing.

According to one aspect of the disclosure, a method of mass manufacturing uniquely decorated parts includes (a) processing an item of master artwork into a format that is usable by a manufacturing tool, the master artwork having a size larger than any one of the parts; (b) determining a portion of the master artwork to be represented on a current one of the parts; (c) processing the part with the manufacturing tool so that the determined portion of the master artwork is represented on the current part; and (d) repeating (b) and (c) for plural parts, wherein the determined portion is different for each of the parts.

According to one embodiment of the method, the parts are housing pieces for an electronic device.

According to one embodiment of the method, the electronic device is a mobile telephone.

According to one embodiment of the method, the manufacturing tool is a laser etching machine.

According to one embodiment of the method, the manufacturing tool is a printing machine.

According to one embodiment of the method, the portion of the master artwork for the current part is determined randomly.

According to one embodiment of the method, locations on the master artwork are numbered and each location corresponds to a potential portion of the master artwork that may be represented on the part, and a random number generator generates a number that is matched to one of the numbered locations to identify the portion corresponding to the current part.

According to one embodiment of the method, randomly determining the portion of the master artwork for the current part includes determining a value from which the portion may be identified.

According to one embodiment of the method, the value is at least one of a distance or an angle from a predetermined location on the master artwork.

According to one embodiment of the method, the value is a number that specifies a numbered area of the master artwork.

According to one embodiment of the method, the portions of the master artwork for the parts are determined by systematically selecting non-identical portions of the master artwork.

According to one embodiment of the method, the systematic selection of portions is carried out using a predetermined sequential pattern of selection from the master artwork.

According to one embodiment of the method, the portion of the master artwork for at least one of the parts is selected by a consumer.

According to another aspect of the disclosure, a manufacturing system for making uniquely decorated parts includes a manufacturing tool to decorate the parts; and a controller that controls the manufacturing tool. The controller may be configured to (a) process an item of master artwork into a format that is usable by the manufacturing tool, the master artwork having a size larger than any one of the parts; (b) determine a portion of the master artwork to be represented on a current one of the parts; (c) command the manufacturing tool to process the part so that the determined portion of the master artwork is represented on the current part; and (d) repeat (b) and (c) for plural parts, wherein the determined portion is different for each of the parts.

According to one embodiment of the system, the parts are housing pieces for an electronic device.

According to one embodiment of the system, the electronic device is a mobile telephone.

According to one embodiment of the system, the manufacturing tool is one or a laser etching machine or a printing machine.

According to one embodiment of the system, the portion of the master artwork for the current part is determined randomly.

According to one embodiment of the system, locations on the master artwork are numbered and each location corresponds to a potential portion of the master artwork that may be represented on the part, and the controller generates a random number that is matched to one of the numbered locations to identify the portion corresponding to the part.

According to one embodiment of the system, the random determination of the portion of the master artwork for the current part includes generation of a value from which the portion may be identified.

According to one embodiment of the system, the value is at least one of a distance or an angle from a predetermined location on the master artwork.

According to one embodiment of the system, the value is a number that specifies a numbered area of the master artwork.

According to one embodiment of the system, the portions of the master artwork for the parts are determined by systematically selecting non-identical portions of the master artwork.

According to one embodiment of the system, the systematic selection of portions is carried out using a predetermined sequential pattern of selection from the master artwork.

According to one embodiment of the system, the portion of the master artwork for at least one of the parts is selected by a consumer.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
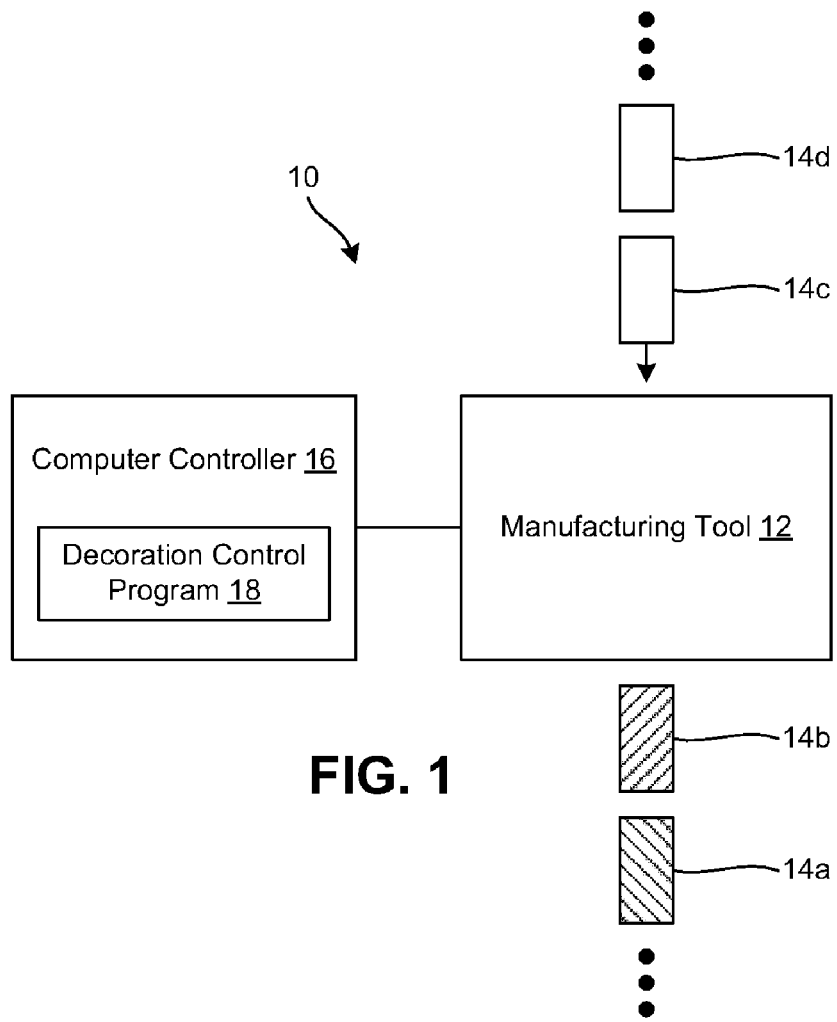
FIG. 1 is a schematic view of an exemplary manufacturing system.

Embodiments will now be described with reference to the drawings, wherein like reference numerals are used to refer to like elements throughout. It will be understood that the figures are not necessarily to scale.

In the present document, embodiments are described primarily in the context of manufacturing housing parts for mobile telephones. Keypads for mobile telephones or combined keypads and housing parts for mobile telephones may be made in a similar manner. It will be appreciated, however, that these exemplary contexts are not the only environments in which aspects of the disclosed systems and methods may be used. Therefore, the techniques described in this document may be applied to any type of appropriate environment, such as making housing parts or other parts for electronic devices other than mobile telephones, or making parts for items without electronic circuitry.

Referring initially to FIG. 1 an exemplary manufacturing system 10 is illustrated. The system 10 may include a manufacturing tool 12, which decorates parts 14 that are undergoing manufacturing. The parts 14 may be in any stage of manufacture. For instance, the parts 14 of the illustrated embodiment are individual units that are being readied for assembly with other parts to form a sale-ready device. In other situations, the parts 14 may already be assembled with other parts to form a partially assembled device or a sale-ready device. In still other situations, the parts 14 may be joined with other parts 14, such as a monolithic sheet of material from which the individual parts 14 will be derived by cutting, stamping or other separating technique.

In the illustrated embodiment, the manufacturing tool 12 is a laser etching machine. The laser etching machine etches a pattern into each part 14 as the part 14 is passed through or otherwise handled by the machine. It will be appreciated that other types of manufacturing tools 12 for decorating the parts 14 may be used. For instance, the manufacturing tool 12 may be a chemical or mechanical etching machine. Still other manufacturing tools 12 include printing devices, painting devices, chemical treating devices, embossing devices, laminating devices, and so forth. One exemplary printer device may be a digital printer for printing monochromatic or color graphics onto plastic, metal or other material, where the surface of the material to be printed is two-dimensional or three-dimensional. In still other embodiments, the manufacturing machine may apply decorated stock to the parts 14, such as in the form of a label. In this case, a pattern on stock material may be printed or formed using the techniques described herein.

In the illustrated example, a first part 14a and a second part 14a have each been decorated by the manufacturing tool 12, but with different appearances to the decoration. A third part 14c is next to be decorated and, thereafter, a fourth part 14d will be decorated. It will be understood that the four illustrated parts may form part of a larger series of parts 14 that may be decorated using the techniques described herein. Also, even if two or more parts are decorated with the same or very similar appearance using the techniques described herein, it is contemplated that the similar appearing parts 14 may be separated so as to be shipped in different lots to different locations, thereby minimizing duplication of similar appearing devices in a local market area. In other embodiments, measures may be taken to track the decorating of parts, and to minimize duplication of appearance in all produced parts 14 or to minimize duplication of appearance in all parts in a single shipping lot.

The manufacturing tool 12 may be controlled with a computer controller 16 that executes a decoration control program 18. In one embodiment, the computer controller 16 may be a general purpose computer that is interfaced with the manufacturing tool 12. In other embodiments, the computer controller 16 may be a dedicated control unit and/or may form part of the manufacturing tool 12. The computer controller 16 may further store a database of artwork in the form of image files. In other embodiments, the database may be stored remotely and accessed over a network.

In one embodiment, the decoration control program 18 is embodied as one or more computer programs (e.g., one or more software applications including compilations of executable code). The computer program(s) and/or database(s) may be stored on a machine (e.g., computer) readable medium, such as a magnetic, optical or electronic storage device (e.g., hard disk, optical disk, flash memory, etc.).

To execute the decoration control program 18, the computer controller 16 may include one or more processors used to execute instructions that carry out a specified logic routine (s). In addition, the computer controller 16 may have a memory for storing data, logic routine instructions, computer programs, files, operating system instructions, databases, and the like. The memory may comprise several devices, including volatile and non-volatile memory components. Accordingly, the memory may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor and the components of the memory may be coupled using a local interface. The local interface may be, for example, a data bus with accompanying control bus, a network, or other subsystem.

The computer controller 16 may have various video and input/output (I/O) interfaces as well as one or more communications interfaces. The interfaces may be used to operatively couple to various peripherals of the computer controller 16, such as a display, a keyboard, a mouse, a microphone, a camera, a scanner, a printer, a speaker and so forth. The communications interfaces may include for example, a modem and/or a network interface card, for communicating with other devices and computers over a network. In one embodiment, the computer controller 16 interfaces with the manufacturing tool 12 over a communications interface.

It will be apparent to a person having ordinary skill in the art of computer programming, and specifically in application programming for machine control, how to program the computer controller 16 to operate and carry out logical functions associated with the decoration control program 18. Accordingly, details as to specific programming code and database structures have been left out for the sake of brevity. Also, while the decoration control program 18 is executed by a general purpose computing device in the illustrated embodiment, such functionality could also be carried out via dedicated hardware, firmware, software, or combinations thereof.

Figure 2:
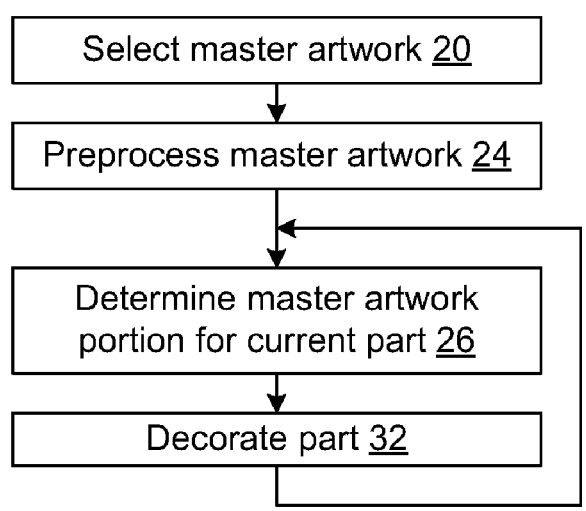
FIG. 2 is a flow chart representing an exemplary method of manufacturing cosmetically unique parts.

With additional reference to FIG. 2, illustrated are logical operations to implement an exemplary method of making uniquely decorated parts for an otherwise mass produced product. The exemplary method may be carried out in part by executing an embodiment of the decoration control program 18 and coordinating steps taken by the manufacturing tool 12, for example. Thus, the flow chart of FIG. 2 may be thought of as depicting steps of a method carried out by the manufacturing system 10. Although FIG. 2 shows a specific order of executing functional logic blocks, the order of executing the blocks may be changed relative to the order shown. Also, two or more blocks shown in succession may be executed concurrently or with partial concurrence.

Figure 3:
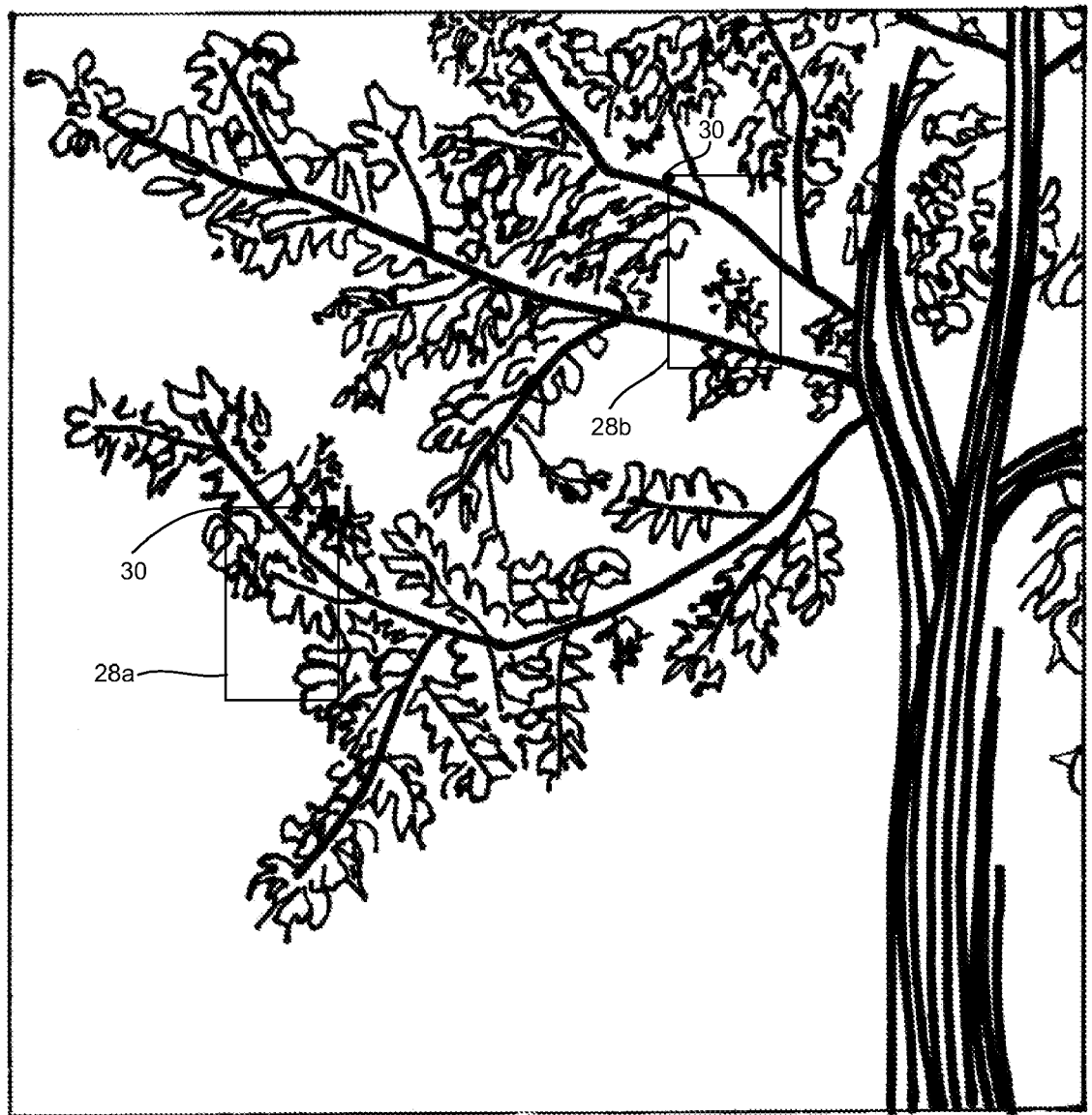
FIG. 3 is an exemplary master artwork for use in the system of FIG. 1 and the method represented by FIG. 2.

The logical flow may start in block 20 where an item of artwork is selected. With additional reference to FIG. 3, this item of artwork may be referred to as an item of master artwork 22 and may be stored electronically in an associated image file in an appropriate data format. In the example of FIG. 3, the exemplary master artwork 22 is a drawing of a tree with a trunk, branches and leaves. It will be appreciated that the master artwork 22 may represent any scene, image or pattern and may be generated in any manner, such as hand drawn, computer generated, by photography, etc. Other exemplary content for the master artwork 22 may be a picture of fair weather clouds, an abstract painting (e.g., a Monet water lilies painting), a floral arrangement, a race car, camouflage, a geometric design, and a skyline. It will be appreciated that the concepts described in this document are not limited in any manner by the content of the master artwork 22. The selection of the master artwork 22 in block 20 may include choosing a particular item from a database or other file structure of plural items of artwork.

Next, in block 24, the master artwork 22 that is selected in block 24 may be preprocessed so as to be in a form that may be used by the manufacturing tool 12 to impart a representation of the content of the master artwork 22 onto an appropriate surface. For instance, in the example of a laser etch machine, the master artwork 22 may be compiled in a laser etch pattern that may be used to guide the laser to impart a representation of the master artwork 22 onto an etchable surface.

In a preferred embodiment, the master artwork 22 corresponds to an image that is larger than the parts 14 that will bear the corresponding representation of the master artwork 22. As will be described, only a portion of the master artwork 22 will be represented on the individual parts 14. But by preprocessing the entire master artwork 22, image data for any portion of the master artwork 22 may be used in the processing of a part 14 when the part 14 is in position to be processed without delay in readying the image data for the manufacturing tool 12. Typically, compiling new laser etch patterns is too slow to realistically allow frequent artwork changes during production. Similar issue may be present for other types of manufacturing tools 12. Therefore, delays under the techniques described herein may be avoided by having image data that is used by the manufacturing tool 12 ready for use by the manufacturing tool 12 when all other conditions for decorating of the part 14 are ready (e.g., the part 14 is in position to be decorated).

In one embodiment, the entire preprocessed version of the master artwork 22 is loaded to the manufacturing tool 12. In other embodiments, a portion of the preprocessed version of the master artwork 22 as needed to process one part 14 is loaded to the manufacturing tool 12. The data handling capacity and speed of the specific manufacturing tool 12 may guide which of these embodiments to use.

The logical flow may proceed in block 26 where a portion 28 of the master artwork 22 to be represented on an individual part 14 is determined. The portion 28 is sized to correspond to the size of the part 14.

In one embodiment, the portion 28 is determined in a systematic manner, such as by using a predetermined sequential pattern of deriving portions 28 from the master artwork 22. For example, the portion 28 for a first part 14*a* may be from the upper left hand corner of the master artwork 22. Then, the portion 28 for a second part 14*b* may be a portion from the master artwork 22 immediately to the right of the portion for the first part 14*a*. The determination of portions 28 may continue until the right edge of the master artwork 22 is reach, at which time the next portion 28 may be a portion from the master artwork 22 immediately below the portion for the first part 14*a* and with subsequent portions moving to the right. Also, the portions 28 may be tiled with respect to each other so that that is some overlap in the portions of the master artwork 22 represented on one part 14 to the next part 14.

Another approach is taken in the illustrated embodiment. In the illustrated embodiment, the portion 18 to be represented on a current part 14 to be decorated is determined randomly. As an exemplary method of randomly selecting the portion 28, locations 30 on the master artwork 22 may be numbered in a matrix format or some other arrangement. In one embodiment, the locations 30 may correspond to pixels of the master artwork 22 (e.g., every tenth pixel or every hundredth pixel in both the x-direction and the y-direction may have a number location).

Each location 30 may represent a point with respect to a portion 28 of the master artwork 22 that may be used in the decorating of a part 14. For instance, each location 30 may be the upper left hand corner of a corresponding portion 28 or may be the center of a corresponding portion 28. Depending on the relationship of the locations 30 to corresponding portions 28, the locations 30 may be arranged with respect to edges of the master artwork 22 so that there are no partial portions 28.

Then, a random number generator that is configured to generate a random number may generate a random number. The random number generator may be implemented to not generate a random number that exceeds the total number of locations 30 or to regenerate the random number if a generated random number exceeds the total number of locations 30. The random number then may be matched to an appropriate one of the numbered locations 30, thereby determining a corresponding portion 28 of the master artwork 22. The random number generator may be part of the decoration control program 18 or called by the decoration control program 18.

In another exemplary implementation, the locations 30 may be defined by two numbers, such as an x-axis (e.g., column) number and a y-axis (e.g., row) number. In this case, the random number generator may generate two random numbers, the first if which may be matched to an x-axis number and the second of which may be matched to a y-axis number, or vice versa. Upon matching of the randomly generated numbers to a location 30, a corresponding portion 28 is also determined.

Another technique to determine a random portion 28 may include generating a random offset distance in the x-direction and a random offset distance in the y-direction from a predetermined point, such as the center of the master artwork 22 or the upper left hand corner of the master artwork 22. The point on the master artwork 22 resulting from the distance values may determine the portion 28. For instance, the point resulting from the distance values may establish the upper left hand corner of a corresponding portion 28 or may establish the center of a corresponding portion 28. Alternatively, a total random offset distance and a random offset direction (e.g., in degrees) from a predetermined point on the master artwork 22 may be used in similar manner. In another embodiment, areas of the master artwork 22 that may serve as the portion 28 may be predetermined and numbered. A random number may then be generated to determine a corresponding portion 28 for an individual part 14.

Another approach to making the determination of block 26 is to allow an individual consumer to select the portion 28 from the larger master artwork 22. The selection may be made using a remote computer that communicates the selection to the computer controller 16. The remote computer may be, for example, a computer that accesses an Internet website that allows for selection of the portion 28 or a computer located a point of sale (e.g., an in-store display).

In one embodiment, the consumer may be able to specify a choice from plural predetermined choices (e.g., "click on" a desired portion with a mouse or select a choice from a menu). In another embodiment, the consumer may be able to delineate a section of the master artwork 22 using a drawing tool or by manipulating a moveable graphical object (e.g., a virtual mask that has an appropriate shape for the part 14). Once selected, the consumer may be presented with a preview image of the device that includes the selected artwork portion as will be used to decorate the corresponding part of the device. Options to change the selected portion 28 may be made available to the consumer.

All or some of the parts 14 in a production run may be decorated using the various selections of plural consumers. If additional parts 14 are to be decorated, the additional portions 28 for the additional parts may be determined in one of the other manners described above or by using a single predetermined portion 28 for each additional part 14. The part 14 having decoration as selected by the consumer may be tracked so that the part 14 forms part of a device that is ultimately delivered to the consumer.

If an area of the master artwork 22 has significant blank space or space of substantially the same color, this area may be made unavailable for serving as a portion of the master artwork 22 for decorating a part. Such designation may be made by a human operator or may be made by automated image analysis.

Following block 26, the logical flow may proceed to block 32 where the current part 14 is decorated. In particular, the manufacturing tool 12 may process the part 14 to decorate the part 14 so that the part 14 cosmetically has a representation of the portion 28 of the master artwork 22 that was determined in block 26. Following block 32, the logical flow may return to block 26 to determine another portion 28 of the master artwork 22 for the next part 14 and that part may be decorated. In this manner, plural parts 14 may be decorated at a relatively high rate of speed, but the parts 14 may have distinguishable cosmetic appearances.

Figure 4:
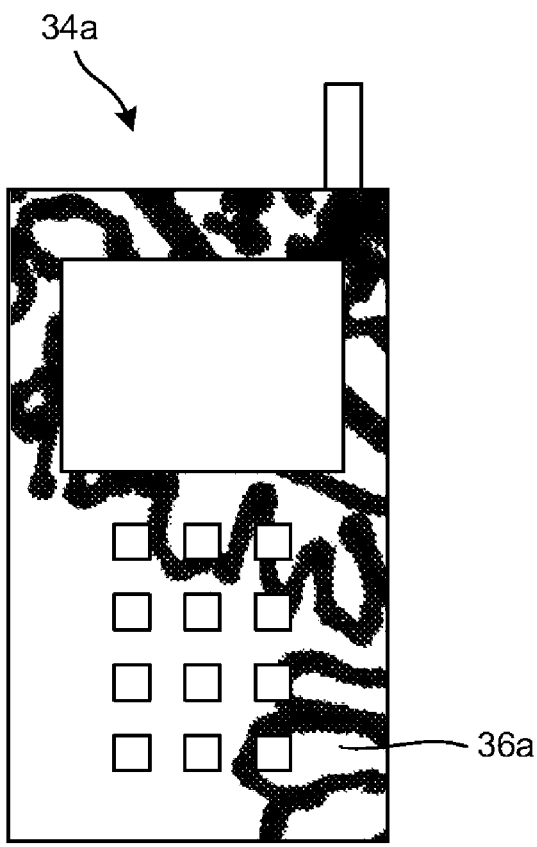
FIGS. 4 and 5 are schematic front views of exemplary uniquely decorated electronic devices made with the system of FIG. 1 and in accordance with the method represented by FIG. 2.
Figure 5:
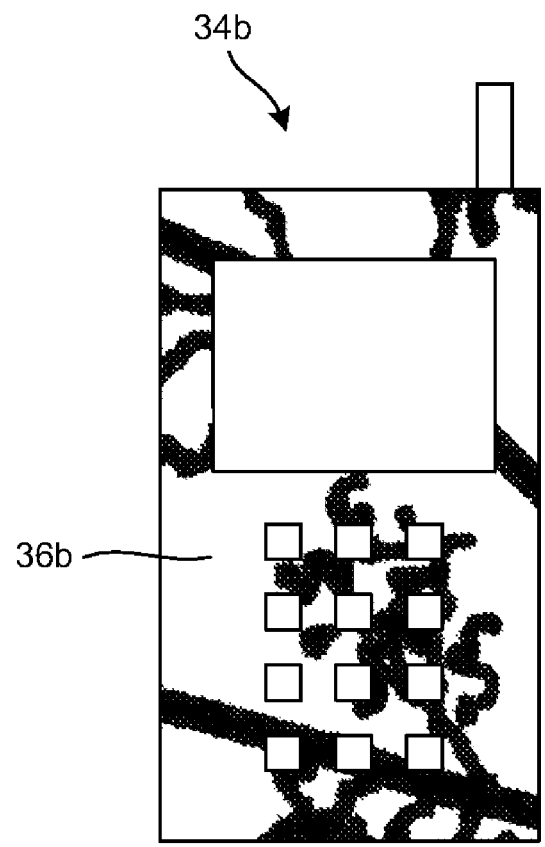

With additional reference to FIGS. 4 and 5, two mobile telephones 34 are respectively shown. Each of the mobile telephones 34 has a cover 36 (e.g., housing part) that was decorated using the above-described techniques. As a result, each of the mobile telephones 34 has a cover 36 with a different appearance, but the decoration for both covers 36 is based on a single piece of artwork. In the illustrated example, a first of the mobile telephones 34*a* has a cover 36*a* that is patterned with a representation of a first portion 28*a* (FIG. 3) of the master artwork 22 and a second of the mobile telephones 34*b* has a cover 36*b* that is patterned with a representation of a second portion 28*b* (FIG. 3) of the master artwork 22.

Although certain embodiments have been shown and described, it is understood that equivalents and modifications falling within the scope of the appended claims will occur to others who are skilled in the art upon the reading and understanding of this specification.

What is claimed is:

1. A method of mass manufacturing uniquely decorated housing pieces for electronic devices, comprising:
   (a) electronically processing an entire item of master artwork that is stored in an associated image file with a computer controller into an electronic format that is usable by a manufacturing tool, the master artwork having a size larger than any one of the housing pieces;
   (b) determining a portion of the master artwork to be represented on a current one of the housing pieces;
   (c) processing the current housing piece with the manufacturing tool so that the determined portion of the master artwork is represented on the current housing piece;
   (d) repeating (b) and (c) for plural housing pieces, wherein the determined portion is different for each of the housing pieces; and
   (e) assembling the electronic devices using the housing pieces; and
   wherein the portion of the master artwork for the current housing piece is determined randomly.

2. The method of claim 1, wherein the electronic devices are mobile telephones.

3. The method of claim 1, wherein the manufacturing tool is a laser etching machine.

4. The method of claim 1, wherein the manufacturing tool is a printing machine.

5. A manufacturing system for making uniquely decorated housing pieces for electronic devices, comprising:
   a manufacturing tool to decorate the housing pieces; and
   a controller that controls the manufacturing tool, the controller configured to:
      (a) electronically process an entire item of master artwork that is stored in an associated image file with into an electronic format that is usable by the manufacturing tool, the master artwork having a size larger than any one of the housing pieces;
      (b) determine a portion of the master artwork to be represented on a current one of the housing pieces;

(c) command the manufacturing tool to process the current housing piece so that the determined portion of the master artwork is represented on the current housing piece; and
(d) repeat (b) and (c) for plural housing pieces, wherein the determined portion is different for each of the housing pieces; and
wherein the portion of the master artwork for the current housing piece is determined randomly.

6. The system of claim 5, wherein the electronic devices are mobile telephones.

7. The system of claim 5, wherein the manufacturing tool is one or a laser etching machine or a printing machine.

8. A method of mass manufacturing uniquely decorated housing pieces for electronic devices, comprising:
   (a) processing an item of master artwork into a format that is usable by a manufacturing tool, the master artwork having a size larger than any one of the housing pieces;
   (b) determining a portion of the master artwork to be represented on a current one of the housing pieces;
   (c) processing the current housing piece with the manufacturing tool so that the determined portion of the master artwork is represented on the current housing piece; and
   (d) repeating (b) and (c) for plural housing pieces, wherein the determined portion is different for each of the housing pieces; and
   wherein the portion of the master artwork for the current housing piece is determined randomly; and
   wherein locations on the master artwork are numbered and each location corresponds to a potential portion of the master artwork that may be represented on the housing piece, and a random number generator generates a number that is matched to one of the numbered locations to identify the portion corresponding to the current housing piece.

9. A method of mass manufacturing uniquely decorated housing pieces for electronic devices, comprising:
   (a) processing an item of master artwork into a format that is usable by a manufacturing tool, the master artwork having a size larger than any one of the housing pieces;
   (b) determining a portion of the master artwork to be represented on a current one of the housing pieces;
   (c) processing the current housing piece with the manufacturing tool so that the determined portion of the master artwork is represented on the current housing piece; and
   (d) repeating (b) and (c) for plural housing pieces, wherein the determined portion is different for each of the housing pieces; and
   wherein the portion of the master artwork for the current housing piece is determined randomly; and
   wherein randomly determining the portion of the master artwork for the current housing piece includes determining a value from which the portion may be identified.

10. The method of claim 9, wherein the value is at least one of a distance or an angle from a predetermined location on the master artwork.

11. The method of claim 9, wherein the value is a number that specifies a numbered area of the master artwork.

* * * * *